(12) United States Patent
Hearn et al.

(10) Patent No.: US 7,200,670 B1
(45) Date of Patent: Apr. 3, 2007

(54) MPEG FLOW IDENTIFICATION FOR IP NETWORKS

(75) Inventors: John P. Hearn, New Providence, NJ (US); Kim N. Matthews, Watchung, NJ (US); Christopher C. Yu, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1073 days.

(21) Appl. No.: 09/608,473

(22) Filed: Jun. 30, 2000

(51) Int. Cl.
  *G06F 15/16* (2006.01)
(52) U.S. Cl. ............... 709/232; 709/218; 709/230; 709/231; 370/392
(58) Field of Classification Search ........ 709/217–219, 709/230–232, 236, 246; 370/392–395.1
See application file for complete search history.

(56) References Cited

U.S. PATENT DOCUMENTS 6,400,720 B1 * 6/2002 Ovadia et al. ......... 370/395.64
6,557,031 B1 * 4/2003 Mimura et al. ............. 709/218

FOREIGN PATENT DOCUMENTS

EP   0 914 009 A2   5/1999
WO   WO 98/02988   1/1998
WO   WO 98/18233   4/1998

OTHER PUBLICATIONS

A. Puri, "Multimedia Systems, Standards, and Networks (chapter 18)", Mar. 2000, XP-002183848, paragraph IV.A, pp. 501-523.
D. Comer, "Internetworking with TCP/IP vol. 1: Principles, Protocols, and Architecture (chapter 29)", Feb. 22, 2000, XP-002183849, paragraph 29.7, pp. 539-552.
D. Hoffman, "RTP Payload Format for MPEG2/MPEG2 Video", Oct. 1, 1996, XP-002144280, pp. 1-11.

* cited by examiner

*Primary Examiner*—Bharat Barot
(74) *Attorney, Agent, or Firm*—Eugene J. Rosenthal

(57) ABSTRACT

The payloads of IP packets are checked to actually determine if a packet contains MPEG-2 video rather than using predefined streams or priority levels that are assumed to contain such information as is done in the prior art. More specifically, the "sync" bytes of the MPEG-2 stream are searched for within the IP packet payload, and when a pattern indicative of the sync bytes is found the sync bytes are identified and the packet is determined to contain MPEG-2 video. The sync byte was defined in MPEG-2 for over-the-air broadcasting in order that a television receiver be able to synchronize the MPEG-2 transport stream packets. Note that the MPEG-2 video, e.g., the MPEG-2 transport stream packets, may or may not be incorporated within real time protocol (RTP) packets before being incorporated into the IP packets.

43 Claims, 2 Drawing Sheets

MPEG FLOW IDENTIFICATION FOR IP NETWORKS

TECHNICAL FIELD

This invention relates to the art of transmitting real-time-constrained information over internet protocol (IP) networks, and more particularly, to identifying particular streams of real-time-constrained information, such as video encoded using Motion Pictures Expert Group (MPEG)-2 encoding, so that they may be given appropriate processing treatment.

BACKGROUND OF THE INVENTION

A problem in the art of transmitting packets containing real-time-constrained information over internet protocol (IP) networks is the need to give each type of information the appropriate processing. In order to do this, it is necessary to know the type of information that is contained within each packet as it passes through the network at each point at which the packet will be processed. In particular, video, such as using Motion Pictures Expert Group (MPEG)-2 encoded video, cannot withstand dropped packets. Therefore, in processing streams of packets that contain MPEG-2 video, it is necessary to give priority to any MPEG-2 video streams over other streams which are less sensitive, or insensitive, to dropped packets.

Prior art techniques prioritize packets based on predefined criteria without actually ascertaining, e.g., by investigating the contents of the packet, that the packets actually contain MPEG-2 video. For example, a packet flow may be defined and it is assumed that all packets in that flow are MPEG-2 packets, and packets from that flow are treated as if they contain MPEG-2 packets without regard for their actual contents. A flow is often defined by specifying source and destination IP addresses for the flow, or by specifying the source/destination port address thereof.

Another prior art technique that is used to prioritize packets is based upon the so-called "type-of-service" (TOS) byte, which is part of the IP packet header. The TOS may be used to indicate a coarse prioritization, so that, for example, it is assumed that any packet with either a predefined value in the TOS byte, or a value in the TOS byte that is at least a predefined value, contains MPEG-2 video and is treated appropriately.

Because these prior art techniques do not actually investigate the contents of the packet to be certain that it contains MPEG-2 video, it is possible that packets that do not contain MPEG-2 video will be processed as if they contained MPEG-2 video. Provided that there is sufficient bandwidth in the processing system, processing these non-MPEG-2 packets, i.e., these fake MPEG-2 packets, as if they were indeed actual MPEG-2 packets is not a problem. However, in the face of limited bandwidth—and what system does not have limited bandwidth—processing these fake MPEG-2 packets as undroppable actual MPEG-2 packets unnecessarily consumes system resources. Furthermore, these prior art prioritization arrangements can be abused by an unscrupulous user who sets his flow, or TOS byte, to indicate that he is sending MPEG-2 video, when in reality he is not.

In addition, setting up the flows in an IP network—the flows being a static configuration that specifies fixed ports—requires administration and/or reconfiguration each time a flow needs to be changed, i.e., a) when a point to point connection changes one of its points, b) when a new connection is made, or c) the like. Note that each switch or processing unit through which an MPEG-2 video stream flows must be updated with the new flow identifying information each time a flow needs to be changed. Thus, there is a constant administrative burden due to the resulting flow churn.

Another problem that arises in prior art arrangements using the TOS byte to define a flow that is to contain MPEG-2 video is the need for all of switches or processing units through which the flow passes to agree to a common TOS byte value, or set of values, that indicate MPEG-2 video. Otherwise, some switches or processing units may not properly handle, e.g., may drop, the MPEG-2 packets. It is difficult in practice to arrange for such agreement, especially when the flow travels over multiple networks.

SUMMARY OF THE INVENTION

We have recognized that that the problems with the prior art can be overcome, in accordance with the principles of the invention, by actually determining that a packet contains MPEG-2 video rather than using predefined streams or priority levels that are assumed to contain such information as is done in the prior art. More specifically, in accordance with an aspect of the invention, the "sync" bytes of the MPEG-2 stream are searched for within the IP packet payload, and when a pattern indicative of the sync bytes is found the sync bytes are identified and the packet is determined to contain MPEG-2 video. The sync byte was defined in MPEG-2 for over-the-air broadcasting in order that a television receiver be able to synchronize the MPEG-2 transport stream packets. Note that the MPEG-2 video, e.g., the MPEG-2 transport stream packets, may or may not be incorporated within real time protocol (RTP) packets before being incorporated into the IP packets.

DETAILED DESCRIPTION

Figure 1:
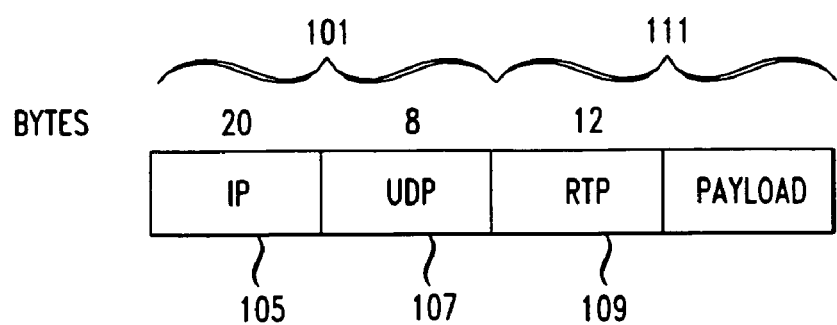
FIG. 1 shows internet protocol (IP) packet that is of the general type for which a determination may be made as to whether or not it contains MPEG-2 video based only on the packet's IP data payload in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

FIG. 1 shows internet protocol (IP) packet 101 that is of the general type for which a determination may be made as to whether or not it contains MPEG-2 video based only on the packet's IP data payload in accordance with the principles of the invention. More specifically, in accordance with an aspect of the invention, a search is performed for the "sync" bytes of the MPEG-2 stream within the IP packet data payload of packet 101. When a pattern indicative of the sync bytes is found, the packet is determined to contain MPEG-2 video. Otherwise, the packet is determined to contain information that is not MPEG-2 video.

Packet 101 has a series of headers which precede IP data payload 111. In particular, packet 101 contains IP header 105, which is 20 bytes long and unreliable datagram protocol/transmission control protocol (UDP/TCP) header 107, which is 8 bytes long. Note that conventionally IP header 105 and UDP/TCP header 107 are conventionally grouped together and referred to as the header for the IP packet. They are shown independently in FIG. 1 for clarity of exposition and pedagogical purposes only.

Note that IP packet 101, as shown, is a UDP packet. This is because, as of this writing, UDP is typically used for real-time streaming, as TCP requires end-to-end communication. Thus, the invention is described herein in terms of UDP packets in IP. However, those of ordinary skill in the art will readily recognize how to apply the principles of the invention to TCP packets.

IP data payload 111 follows UDP/TCP header 109. The number of bytes that are contained within IP data payload 111 is flexible, ranging from 0 and up, although certain transmission arrangements, such as ethernet, may impose other limits. Optional real time protocol (RTP) header 109, if present, is 12 bytes long, and is within IP data payload 111.

Figure 2:
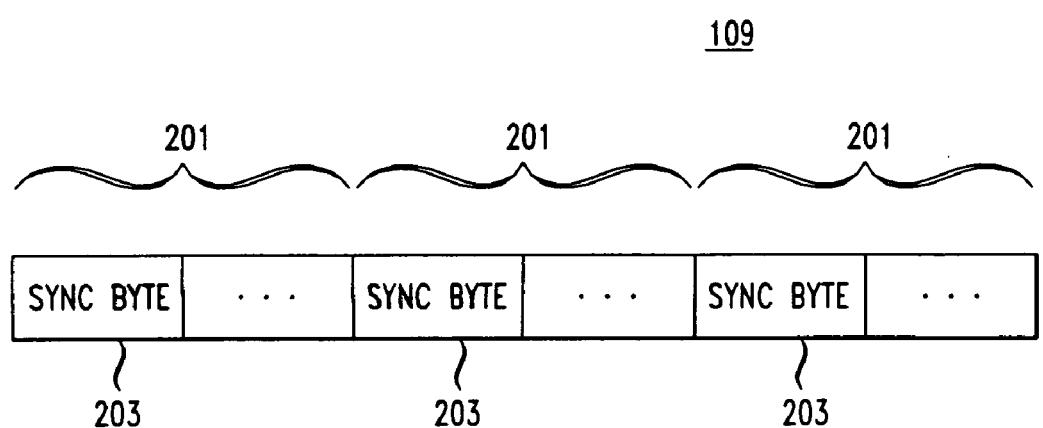
FIG. 2 shows an expanded version of a portion of the packet shown in FIG. 1.

FIG. 2 shows an expanded version of IP data payload 111, which, as packet 101 is a UDP packet, is a UDP data payload. FIG. 2 shows an example in which UDP data payload 111 is carrying MPEG-2 video. As indicated, RTP header 109 may precede the MPEG-2 video within UDP data payload 111.

Consistent with any size limitations placed on it, UDP data payload 111 may carry any arbitrary number of MPEG-2 transport stream packets 201. Each of MPEG-2 transport stream packets 201 is 188 bytes in length. By virtue of the definition of the MPEG-2 transport layer, the first byte of each of MPEG-2 transport stream packets 201 is always a so-called "sync" byte 203, which has the value of 0x47.

In accordance with the principles of the invention, due to the regular spacing of the sync byte, it is possible to search through UDP data payload 111 for the presence of the expected pattern of MPEG-2 video, i.e., a pattern of having a sync byte as the first byte of UDP data payload 111—after any optional RTP header—and thereafter having a sync byte at each byte position in UDP data payload 111 that is a multiple of 188. Although finding a sync byte as the first byte of UDP data payload 111, after any optional RTP header, gives a strong indication that the IP packet contains MPEG-2 video, and it is assumed that for UDP data payloads of length 188 for which the first byte has the value of a sync byte that the packet contains MPEG-2 video, preferably each potential sync byte position should be checked. This is because the confidence level that MPEG-2 video has actually been found increases substantially when each position indeed contains a sync byte value.

In the event that most of the expected positions contain a sync byte, but one or more do not, whether or not to declare the packet as one containing MPEG-2 video is at the discretion of the implementor when designing, or configuring, the system. For example, if only one position at which a sync byte would be expected was not a sync byte, and the IP packet was indicated to have a transmission error, then the implementor may decide to have the system still treat the packet as containing MPEG-2 video.

Figure 3:
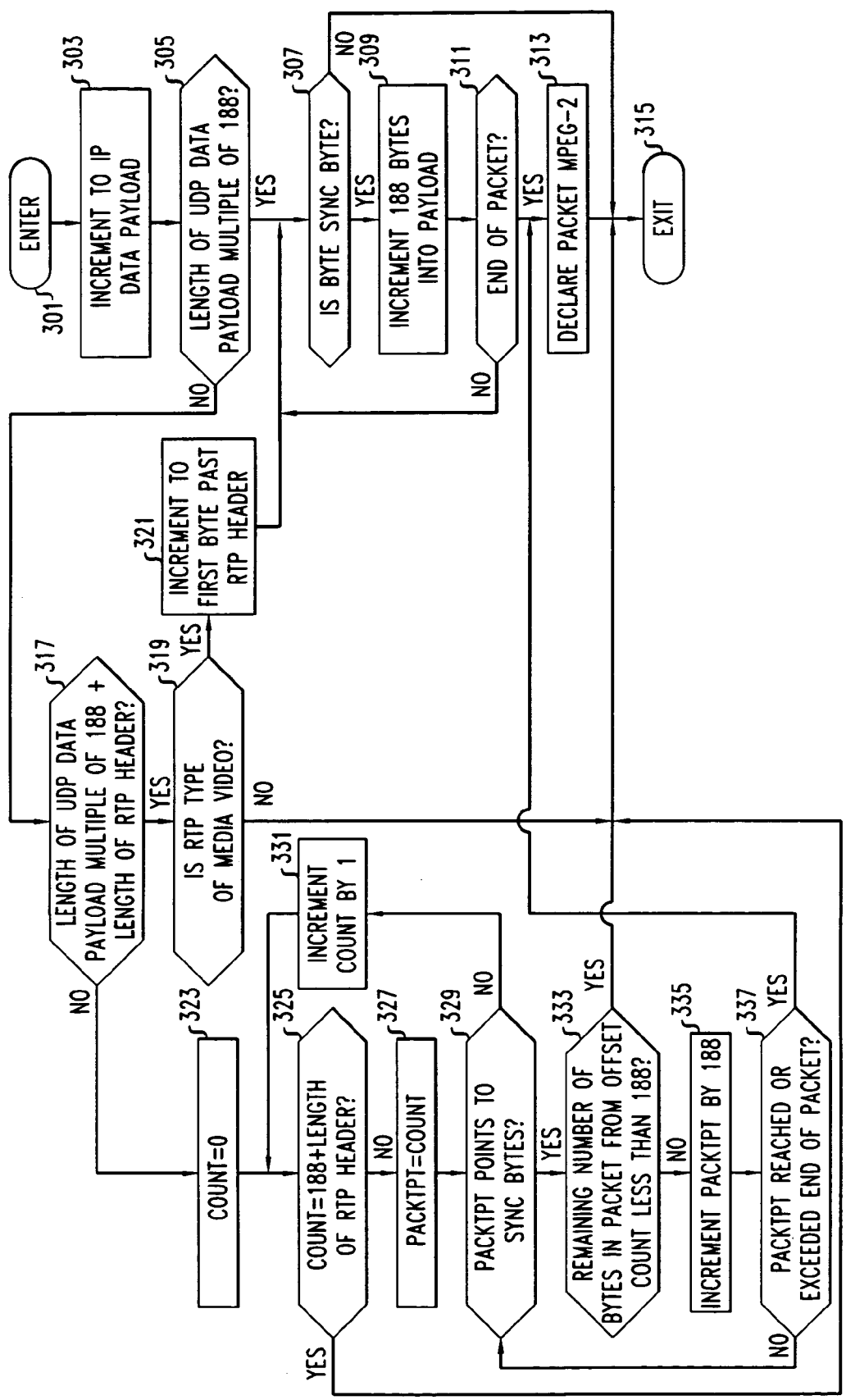
FIG. 3 shows an exemplary process, in flowchart form, for processing an IP packet to determine if it contains MPEG-2 video, in accordance with the principles of the invention.

FIG. 3 shows an exemplary process, in flowchart form, for processing an IP packet to determine if it contains MPEG-2 video, in accordance with the principles of the invention. The process is entered in step 301 when an IP packet is received. Next, in step 303, the packet is processed so there is a pointer that points to the UDP data payload within the packet, i.e., a pointer pointing within the packet is incremented to point to the UDP data payload. Thereafter, conditional branch point 305 tests to determine if the length of the UDP data payload is a multiple of 188. If the test result in step 305 is YES, indicating that there is no RTP header and that the length of the UDP data payload corresponds to a multiple of the length of MPEG-2 transport stream packet, control passes to conditional branch point 307, which tests to determine if the byte of the UDP data payload being pointed to by the pointer has the value of a sync byte, e.g., 0x47.

If the test result in step 307 is YES, control passes to step 309, which increments the pointer 188 bytes, i.e., the length of an MPEG-2 transport stream packet. This should result in the pointer pointing either at a) the beginning of the next MPEG-2 transport stream packet or to the end of the UDP data payload, which is also the end of the packet, provided the UDP data payload actually contains MPEG-2 video, or b) just a random byte when the UDP data payload does not actually contain MPEG-2 video. Thereafter, control passes to conditional branch point 311, which tests to determine if the end of the IP packet has been reached. If the test result in step 311 is NO, indicating that there yet remains additional portions of the UDP data payload to process, control passes back to step 307 to process the rest of the packet as described above. If the test result in step 311 is YES, control passes to step 313, and the IP packet is declared to be one containing MPEG-2 video, in accordance with an aspect of the invention. It may then be further processed accordingly. The process exits in step 315.

If the test result in step 307 is NO, indicating that either the first byte or another byte at a 188 multiple position does not have the value of a sync byte, control passes to step 315 and the process is exited.

If the test result in step 305 is NO, control passes to conditional branch point 317, which tests to determine if the length of the UDP data payload is equal to a multiple of 188 plus the length of the RTP header. If the test result in step 317 is YES, indicating that the UDP data payload may contain an RTP header and thereafter MPEG-2 transport stream packets, control passes to step conditional branch point 319, which tests to determine if the first bytes of the UDP data payload which correspond in length to an RTP header, have the characteristics of an RTP header, e.g., there is a video indicator in the location where the payload type field is expected. More specifically, the payload type field is 7 bits, with the definition for MPEG-2 transport stream data being 0x21.

If the test result in step 319 is NO, which indicates that there was no RTP header or that the header was not indicative of video, control passes to step 315 and the process is exited without declaring the IP packet to be one containing MPEG-2 video. If the test result in step 319 is YES, indicating that an RTP header for video was found, control passes to step 321, in which the pointer is incremented to point to the first byte after the RTP header. Control then passes to conditional branch point 307 and the process continues as described above.

If the test result in step 317 is NO, indicating that the IP packet does not contain a whole number of MPEG-2 video transport stream packets, control passes to step 323, in which a counter variable COUNT, which is to be used as the offset into the UDP data payload, is set to 0. Next, conditional branch point 325 tests to determine if COUNT is equal to the sum of 188 and the length of an RTP header. If the test result in step 325 is YES, indicating that all the positions that could potentially contain a sync byte of a first MPEG-2 video transport stream packet in the UDP data payload have been tested and not been found to be a sync byte, the process is exited in step 315, i.e., the packet is not declared to contain MPEG-2 video. If the test result in step 325 is NO, indicating that all the positions that could potentially contain a sync byte of a first MPEG-2 video transport stream packet in the UDP data payload have not been tested, control passes to conditional branch point 327 in which another pointer, PACKTPT, is set to the value of COUNT.

Thereafter, in step 329, the byte within the UDP data payload pointed to by PACKTPT is tested to determine if it has the value of a sync byte. If the test result in step 329 is NO, indicating that the byte currently pointed to by PACKTPT is not a sync byte, control passes to step 331 in which COUNT is incremented, so that it will point to the next byte in the UDP data payload. Control then passes back to step 325, and the process continues as described above.

If the test result in step 329 is YES, indicating that the byte currently pointed to by PACKTPT indeed has the value of a sync byte, control passes to conditional branch point 333, which tests to determine if the remaining number of bytes in the packet from the place being pointed to by COUNT is less than 188. If the test result in step 333 is YES, indicating that a whole MPEG-2 video transport stream packet cannot be contained within the UDP data payload, control passes to step 315 and the process is exited, i.e., the packet is not declared to contain MPEG-2 video. If the test result in step 333 is NO, indicating that a whole MPEG-2 video transport stream packet could be contained within the UDP data payload, control passes to step 335, in which PACKTPT is incremented by 188.

At this point, if the UDP data payload indeed contains MPEG-2 video and the byte currently pointed to by COUNT is a sync byte, the byte pointed to by PACKTPT should also have the value of a sync byte, or at or beyond the end of the packet. To this end, conditional branch point 337 tests to determine if the end of the packet has been reached or is exceed. If the test result in step 337 is NO, indicating that PACKTPT points to a byte within the UDP data payload, control passes back to step 329 and the process continues as described above. If the test result in step 337 is YES, indicating that PACKTPT points to the end of the packet or beyond, control passes to step 313 and the process continues as described above.

Note that the discussion herein with regard to IP refers to IP version 4, which is essentially universally in use as of the time of the writing of this application. Those of ordinary skill in the art will be readily able to apply the principles of the invention to later developed version of IP, such as proposed version 6, should one be implemented.

What is claimed is:

1. A method for processing an internet protocol (IP) packet, comprising the step of identifying that said packet contains motion picture expert group (MPEG)-2 video as a function of only the contents of said IP data payload of said IP packet exclusive of any information in any real time protocol (RTP) header which may be therein.

2. The invention as defined in claim 1 wherein said MPEG-2 video is in transport stream format.

3. The invention as defined in claim 1 wherein said IP data payload contains at least one real time protocol (RTP) packet which contains said MPEG-2 video.

4. The invention as defined in claim 1 wherein said IP data payload is a unreliable datagram protocol (UDP) data payload.

5. The invention as defined in claim 1 wherein said IP data payload is a transmission control protocol (TCP) data payload.

6. The invention as defined in claim 1 further comprising the step of processing said IP packet with a priority assigned for packets containing video when said packet is identified in said identifying step to contain video.

7. The invention as defined in claim 1 wherein said identifying step further includes the steps of:
   determining whether or not there exists within said IP data payload at least an expected pattern of MPEG-2 sync bytes that is indicative of the presence of MPEG-2 video.

8. The invention as defined in claim 7 wherein said determining step further comprises the step of:
   comparing a first byte of said IP data payload after any real time protocol (RTP) header to the value of an MPEG-2 sync byte; and
   when the result of said comparing step is that said first byte of said IP data payload has the same value as an MPEG-2 sync byte, declaring said IP packet to be an MPEG-2 packet.

9. The invention as defined in claim 7 wherein said determining step further comprises the step of:
   comparing a first byte of said IP data payload after any real time protocol (RTP) header to the value of an MPEG-2 sync byte; and
   when the result of said comparing step is that said first byte of said IP data payload is an MPEG-2 sync byte and the length of said IP data payload after any RTP header is the same as the length of an MPEG-2 transport stream packet, declaring said IP packet to be an MPEG-2 packet.

10. The invention as defined in claim 7 wherein said determining step further comprises the step of:
    terminating said process and indicating that said expected pattern does not exist in said packet unless the length of said IP data payload or the length of said IP data payload less the length of a real time protocol (RTP) header is an integral multiple of the length of an MPEG-2 transport stream packet;
    pointing a pointer to a byte in said IP data payload, said byte being a first byte of said IP data payload when said length of said IP data payload is an integral multiple of the length of an MPEG-2 transport stream packet and said byte being a first byte of said IP data payload after the length of a real time protocol (RTP) header when said IP data payload less the length of a real time protocol (RTP) header is an integral multiple of the length of an MPEG-2 transport stream packet;
    performing a comparison between said byte being pointed to with the value of an MPEG-2 sync byte and declaring said IP packet as a candidate to be an MPEG-2 packet when the result of a most recent comparison is that said pointed to byte of said IP data payload has the same value as an MPEG-2 sync byte adjusting said pointer to point to byte in said IP data payload that is offset toward the end of said IP packet by the length of an MPEG-2 transport stream packet;
    repeating said performing and adjusting steps so long as said most recently executed performing step declared said IP packet as a candidate to be an MPEG-2 packet and the end of said IP data payload is not yet reached; and
    declaring said packet to be an MPEG-2 packet when the end of said IP data payload is reached during an attempt to execute said adjusting step and said most recently executed performing step declared said IP packet as a candidate to be an MPEG-2 packet.

11. The invention as defined in claim 7 wherein said expected pattern is an MPEG-2 sync byte value spaced 188 byte positions apart.

12. The invention as defined in claim 7 wherein said expected pattern is an MPEG-2 sync byte value spaced apart by the length of an MPEG-2 transport stream packet.

13. The invention as defined in claim 7 wherein said determining step further comprises the step of:
    declaring said IP packet to be an MPEG-2 packet when a search over the length of a real time protocol header and the length of one MPEG-2 transport stream packet finds sync byte for which offset therefrom by the length of one MPEG-2 transport stream packet there is another sync byte.

14. The invention as defined in claim 7 wherein said determining step further comprises the step of:
    declaring said IP packet to be an MPEG-2 packet when a search over the length of a real time protocol header and the length of one MPEG-2 transport stream packet finds the value of a sync byte for which offset therefrom at each integral multiple of the length of one MPEG-2 transport stream packet there is the value of a sync byte until the end of said IP packet is reached or exeeded.

15. The invention as defined in claim 7 wherein said determining step further comprises the step of:
    declaring said IP packet to be an MPEG-2 packet when a search over the length of a real time protocol header and the length of one MPEG-2 transport stream packet finds the value of a sync byte for which offset therefrom by the length of one MPEG-2 transport stream packet there is the end of packet.

16. The invention as defined in claim 7 wherein said each of said sync bytes has a value of 0x47.

17. The invention as defined in claim 7 wherein said at least one expected pattern is the value of an MPEG-2 sync byte as the first byte of said IP data payload.

18. The invention as defined in claim 7 wherein said expected pattern is the value of an MPEG-2 sync byte as the first byte of said IP data payload and every 188 bytes thereafter till the end of said IP data payload.

19. The invention as defined in claim 7 wherein said at least one expected patterns includes at least one of the sets of patterns consisting of: a) the value of an MPEG-2 sync byte as the first byte of said IP data payload after the length of a real time protocol (RTP) header and said IP data payload after said RTP header length has a length of 188 bytes, b) the value of an MPEG-2 sync byte as the first byte of said IP data payload after the length of a real time protocol (RTP) header and every 188 bytes thereafter till the end of said IP data payload, c) the value of an MPEG-2 sync byte as the first byte of said IP data payload and every 188 bytes thereafter till the end of said IP data payload, d) the value of an MPEG-2 sync byte as the first byte of said IP data payload and said IP data payload has a length of 188 bytes.

20. A method for processing an Internet protocol (IP) packet, comprising the steps of:
    searching through a payload of said IP packet exclusive of any information in any real time protocol (RTP) header therein for a pattern indicative of the presence of motion picture expert group (MPEG)-2 video; and
    indicating that said IP packet contains MPEG-2 video only if said pattern is found.

21. The invention as defined in claim 20 wherein said searching step further includes the step of:
    determining whether a payload of said IP packet has a length equal to an integral multiple of a length of an MPEG-2 transport stream packet either before or after subtracting from said payload length the length of an RTP head.

22. The invention as defined in claim 20 wherein said searching step further includes the steps of:
  determining that a payload of said IP packet has a length equal to a length of an MPEG-2 transport stream packet;
  comparing the value of a first byte at a first location within said packet with the value of an MPEG-2 sync byte; and
  signaling said pattern is found when the result of said comparing step is that said value of said first byte at said first location matches the value of said sync byte.

23. The invention as defined in claim 20 wherein said searching step further includes the step of:
  determining whether a payload of said IP packet has a length equal to an integral multiple of a length of an MPEG-2 transport stream packet,
  comparing the value of a first byte at a first location within said packet and each byte at an offset of a length of an MPEG-2 transport stream packet therefrom with the value of an MPEG-2 sync byte; and
  signaling said pattern is found when the result of each comparison performed in said comparing step is that said first byte of said packet being compared matches the value of said sync byte.

24. The invention as defined in claim 20 wherein said searching step further includes the step of:
  determining whether a payload of said IP packet has a length equal to an integral multiple of a length of an MPEG-2 transport stream packet,
  comparing the value of a first byte at a first location within said packet and each byte at an offset of a length of an MPEG-2 transport stream packet therefrom with the value of an MPEG-2 sync byte; and
  signaling said pattern is found when the result of a majority of comparisons performed in said comparing step is that said first byte of said packet being compared matches the value of said sync byte.

25. The invention as defined in claim 20 wherein said searching step further includes the step of:
  determining whether a payload of said IP packet has a length equal to an integral multiple of a length of an MPEG-2 transport stream packet,
  comparing the value of a first byte at a first location within said packet and each byte at an offset of a length of an MPEG-2 transport stream packet therefrom with the value of an MPEG-2 sync byte; and
  signaling said pattern is found when the result of at least a majority of comparisons performed in said comparing step is that said first byte of said packet being compared matches the value of said sync byte and said packet was indicated to contain an error.

26. The invention as defined in claim 20 wherein said payload is at least one of a set of payloads within an IP packet, said set consisting of: a) an IP data payload, b) an unreliable datagram protocol (UDP) data payload that does not include a real time protocol (RTP) header, c) that portion of a UDP data payload after an RTP header that is included in said UDP data payload, and d) a transmission control protocol (TCP) data payload.

27. The invention as defined in claim 20 further comprising the step of processing said IP packet with a priority assigned for packets containing video when said indicating step indicates that said IP packet contains video.

28. The invention as defined in claim 20 wherein said pattern corresponds to the value of an MPEG-2 sync byte regularly spaced from an initial position through the end of said payload, said regular spacing being equal to the length of an MPEG-2 transport stream packet, said initial position being located within the length of a real time protocol header and the length of one MPEG-2 transport stream packet from a start of said payload.

29. The invention as defined in claim 20 wherein said pattern corresponds to the value of an MPEG-2 sync byte and the end of said IP packet spaced apart by the length of one MPEG-2 transport stream packet, said initial position being located within the length of a real time protocol header and the length of one MPEG-2 transport stream packet from a start of said payload.

30. The invention as defined in claim 20 wherein said pattern corresponds to the value of an MPEG-2 sync byte regularly spaced from an initial prescribed position, said regular spacing being equal to the length of an MPEG-2 transport stream packet.

31. A method for processing an internet protocol (IP) packet, comprising the steps of:
  searching through a payload of said IP packet exclusive of any information in any real time protocol (RTP) header therein for a pattern indicative of the presence of motion picture expert group (MPEG)-2 video; and
  indicating that said IP packet contains MPEG-2 video when said pattern is most likely found.

32. The invention as defined in claim 31 wherein said pattern corresponds to an MPEG-2 sync byte regularly spaced from an initial prescribed position, said regular spacing being equal to the length of an MPEG-2 transport stream packet.

33. The invention as defined in claim 32 wherein said initial prescribed position is a position within the group of positions consisting of: a) the first byte in an IP data payload of said packet, b) the first byte of a UDP payload of said IP packet, c) the first byte after an RTP header of an unreliable datagram protocol (UDP) payload of said IP packet, d) the first byte of a transport control protocol (TCP) payload of said IP packet, and e) the first byte of a TCP payload after a header contained therein indicating real time information is contained in said IP packet.

34. The invention as defined in claim 31 further comprising the step of processing said IP packet with a priority assigned for packets containing video when said indicating step indicates that said IP packet contains video.

35. A method for processing an internet protocol (IP) packet, comprising the steps of:
  searching through a payload of said IP packet exclusive of any information in any real time protocol (RTP) header therein for a pattern indicative of video; and
  indicating that said IP packet contains video when said pattern is found; and
  indicating that said IP packet does not contain video when said pattern is not found.

36. The invention as defined in claim 35 further comprising the step of processing said IP packet with a priority assigned for packets containing video when it is indicated that said IP packet contains video.

37. The invention as defined in claim 35 wherein said pattern corresponds to the value of an MPEG-2 sync byte regularly spaced from an initial position through the end of said payload, said regular spacing being equal to the length of an MPEG-2 transport stream packet, said initial position being located within the length of a real time protocol header and the length of one MPEG-2 transport stream packet from a start of said payload.

38. The invention as defined in claim 35 wherein said pattern corresponds to the value of an MPEG-2 sync byte regularly spaced from an initial prescribed position, said regular spacing being equal to the length of an MPEG-2 transport stream packet.

39. The invention as defined in claim 38 wherein said initial prescribed position is a position within the group of positions consisting of: a) the first byte in an IP data payload of said packet, b) the first byte of a UDP payload of said IP packet, c) the first byte after an RTP header of an unreliable datagram protocol (UDP) payload of said IP packet, d) the first byte of a transport control protocol (TCP) payload of said IP packet, and e) the first byte of a TCP payload after a header contained therein indicating real time information is contained in said IP packet.

40. A computer program in the form of machine readable instructions, said computer program being for causing a system including a processor to:
   search through a payload of an internet protocol (IP) packet exclusive of any information in any real time protocol (RTP) header therein for a pattern indicative of the video;
   indicate that said IP packet contains video when said pattern is found; and
   indicate that said IP packet does not contain video when said pattern is not found.

41. The invention as defined in claim 40 wherein said computer program further causes said processor to
   process said IP packet with a priority assigned for packets containing video when said IP packet is indicated to contain video.

42. Apparatus comprising:
   a processor;
   a memory coupled to said processor for storing a received internet protocol (IP) packet; and
   a program store;
   wherein said program store contains instructions for causing said processor to
   search through a payload of an internet protocol (IP) packet exclusive of any information in any real time protocol (RTP) header therein for a pattern indicative of the video;
   indicate that said IP packet contains video when said pattern is found; and
   indicate that said IP packet does not contain video when said pattern is not found.

43. Apparatus, comprising:
   means for searching through a payload of an internet protocol (IP) packet exclusive of any information in any real time protocol (RTP) header therein for a pattern indicative of video; and
   means for indicating that said IP packet contains video when said pattern is found.

* * * * *